United States Patent [19]
Palloch

[11] 3,885,175
[45] May 20, 1975

[54] ELECTRIC MOTOR VARIABLE SPEED AND CONTROL DRIVE

[75] Inventor: Herbert Palloch, Schwetzingen, Germany

[73] Assignee: Frankl and Kirchner, Schwetzingen, Germany

[22] Filed: Dec. 26, 1973

[21] Appl. No.: 428,194

[30] Foreign Application Priority Data
Dec. 23, 1972 Germany............................ 2263259

[52] U.S. Cl................ 310/68 D; 310/76; 192/18 B
[51] Int. Cl.............................................. H02k 11/00
[58] Field of Search..................... 310/68 D, 72, 76; 192/18 B

[56] References Cited
UNITED STATES PATENTS
| | | | |
|---|---|---|---|
| 1,896,328 | 2/1933 | Pohl | 310/68 D |
| 3,582,986 | 6/1971 | Yokoyama | 310/76 |
| 3,675,057 | 7/1972 | Pleuger | 310/68 D |
| 3,750,781 | 8/1973 | Lengfeld | 310/76 X |

*Primary Examiner*—George Harris
*Attorney, Agent, or Firm*—Browdy & Neimark

[57] ABSTRACT

An electric motor variable speed and control drive having a motor, a brake and a clutch element combined with the motor and a control unit for operating the brake and clutch elements in a predetermined sequence. The control unit includes a transformer which is a ring-core transformer mounted in or on the motor or the brake and clutch elements coaxially with the axis thereof.

6 Claims, 4 Drawing Figures 3,885,175

ELECTRIC MOTOR VARIABLE SPEED AND CONTROL DRIVE

FIELD OF THE INVENTION

The present invention relates to an electric motor variable speed and control drive and more particularly to such a drive including a transformer which is built into the drive unit in a compact and easily cooled manner.

BACKGROUND OF THE INVENTION

The invention concerns an electric motor variable speed and control drive, consisting of a motor, a clutch and brake element combined with the motor, and a control element for clutching and braking, with a transformer provided as the control element. Such electric motor drives are generally known. They are preferably used to drive sewing machines for industrial application. The motor operates continuously while the sewing machine is connected to the motor alternately or simultaneously by means of a clutch and a brake. The clutch and brake are operated by the control element, for example, as a function of needle position in order to ensure that the sewing machine stops at a preset position, for example one with the needle in the upper dead center position. In addition, such a control element can also serve to operate a thread cutter at the end of a sewing process.

The design and operation of the clutch and brake disc of a brake and clutch element are known, for example, from DT-OS No. 1,625,714. The design and method of operation of such a control element are known, for example, from DT-AS No. 1,291,014 or DT-OS No. 1,513,773. A synchronizer which transmits a signal to the control element is known, for example, from DT-OS No. 1,925,301.

The entire control element is usually placed in a separate housing with the exception of the synchronizer, said housing being fastened to the motor housing. A transformer is required for the entire control element, said transformer heretofore usually being located in said control panel. This requires considerable space, the latter being increased still further by virtue of the fact that the transformer can be cooled only by radiation and free convection. Excessive development of heat by the transformer will damage the temperature-sensitive semiconductor components of which the control element is primarily composed.

SUMMARY OF THE INVENTION

The object of the present invention is to design and install the transformer in such a fashion that the space requirements are reduced and the heat from the transformer no longer endangers the temperature-sensitive semiconductor components.

This object is achieved according to the present invention by constructing the transformer as a ring-core transformer and mounting it in or on the motor or the clutch and brake element coaxially with respect to the axis of the motor and/or clutch and brake element. The critical advantage consists in the fact that a transformer made in the form of a ring-core transformer can be installed in spaces in the motor or the clutch and brake element which are provided for in any case by the design, so that all of the space previously provided for a shell-type transformer in the control panel is freed. Another considerable improvement consists in the fact that the ring-core transformer in the arrangement according to the invention may be located in the cooling air path of the motor or the clutch and brake element, so that no thermal problems of any kind exist any longer, said problems having previously also contributed to a definite overdimensioning of the transformer.

In concrete embodiments the ring-core transformer is fastened to one of the bearing plates of the motor or the clutch and brake element, and available support surfaces or at least slightly suitable support surfaces can be used for fastening. Furthermore, it is possible to mount the ring-core transformer on a housing that covers the ventilating fan with which the motor is equipped in any case, thereby ensuring particularly well that the ring-core transformer is located in the intake path of the cooling air. It is sufficient if the ring-core transformer is fastened with one flat surface and one inner or outer cylindrical surface against the corresponding support surfaces of the motor or the brake and clutch element. The assembly can be carried out in a particularly simple fashion by having the ring-core transformer fastened to these supporting surfaces by means of casting resin. The other half of its surface will then be exposed to the direct stream of cooling air.

Further advantages and features of the invention will be evident from the description using sample embodiments as shown in the drawings.

DESCRIPTION OF PREFERRED EMBODIMENTS

Figure 1:
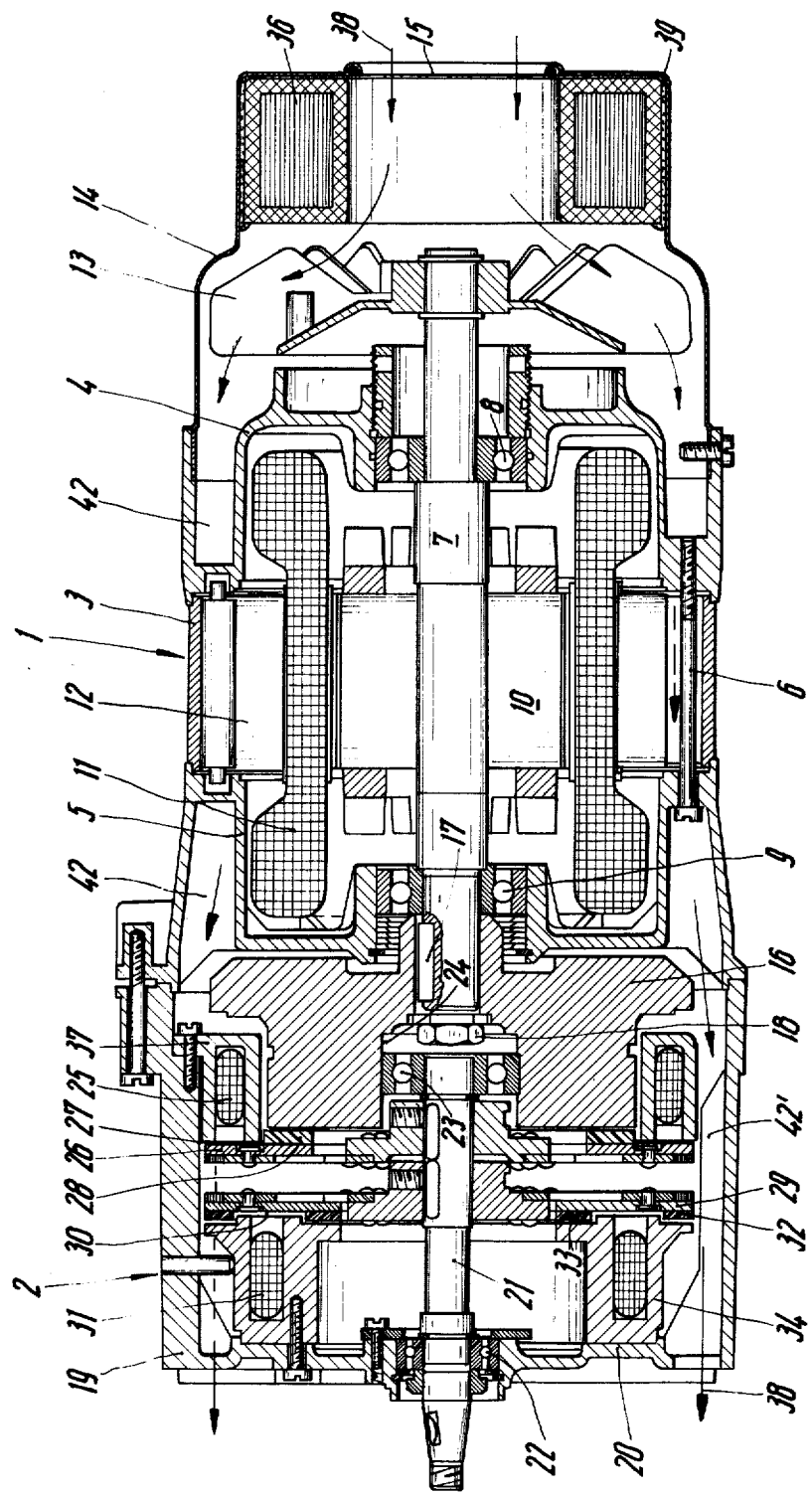
FIG. 1 is a horizontal lengthwise section through a motor with a screwed-on clutch and brake element and a ring-core transformer in a fan housing.

FIG. 1 shows a constantly rotating asynchronous squirrel-cage motor 1 with a coaxially attached clutch and brake element 2.

The motor consists primarily of a cylindrical stator housing 3, with bearing plates 4 and 5 screwed onto both ends by means of through connecting screws 6, with a shaft 7 mounted by means of ball bearings 8 and 9 in said housing. A rotor lamination bundle 10 is mounted coaxially on shaft 7. A stator winding 11 and a stator lamination bundle 12 are mounted concentrically with respect to the rotor lamination bundle in the stator housing. A fan 13 is mounted on shaft 7 in the vicinity of one end, said fan serving to force cooling air through the motor. The fan is covered by a housing 14 mounted on a spatially arranged bearing plate 4, said housing provided with a screen 15 through which the cooling air is drawn.

A driven plate 16 is mounted radially by means of a spring and groove connection 17 and axially by means of a threaded nut 18 on the end of the shaft opposite fan 13. Such a motor is generally known.

The clutch and brake element 2 is mounted coaxially by means of a threaded bolt connection to bearing plate 5 mounted on driven plate 16. The cylindrical outer part 19 of this clutch and brake element 2 is closed off at the end opposite motor 1 in one piece with a bearing plate 20. A drive shaft 21 is mounted coaxially with respect to shaft 7 in the cylindrical part 19, said drive shaft being mounted at one end in a ball bearing 22 in a bearing plate 20 and on the other end in a ball bearing 23 in a corresponding bearing mount 24 in driven plate 16.

A coil 25 of an electromagnetic clutch is mounted on the inner wall of cylindrical part 19, concentrically with respect to driven plate 16, core 37 of said coil surrounding said coil on three sides and fastened to cylindrical part 19. Clutch plate 26 of the clutch is mounted in a rotationally fixed manner to drive shaft 21. When coil 25 is energized, said clutch plate 26, being made of magnetizable material, for example iron, is attracted across an air gap 27 between the core 37 and the clutch plate 26, so that frictional coating 28 on clutch plate 26 comes in contact with the face of driven plate 16, so that drive shaft 21 is coupled to motor shaft 7.

A coil 31 of an electromagnetic brake is mounted in cylindrical part 19, likewise concentrically with respect to drive shaft 21 and at a distance from the latter, the core 34 of said electromagnetic brake being fastened to bearing plate 20 and surrounding said brake on three sides. Brake disc 29 of the brake is rotatably fixed to drive shaft 21. When coil 31 is energized, the brake disc 29, likewise made of magnetizable material, for example iron, is drawn across an air gap 30 between the core 34 and the brake disc 29, causing annular brake linings 32 and 33 to come in contact with the corresponding faces of the core 34, thus effecting a braking of drive shaft 21. The design and operation of the clutch and brake discs are presented and described in DT-OS No. 1,625,715.

A pulley, mounted on the projecting free end of drive shaft 21, may be attached to drive (for example) a sewing machine.

The energizing and deenergizing of clutch coil 25 and brake coil 31 can be accomplished by means of a circuit like that shown and described in DT-AS No. 1,291,014 or DT-OS No. 1,513,773, for example. Such a circuit is placed in a control panel 35 on the motor housing, indicated in FIG. 2-4. Such control circuits are operated with direct current using a voltage which is less than line voltage, therefore requiring a transformer which previously has been made in the form of a shell-type transformer and was mounted in control panel 35.

In the sample embodiments shown in FIG. 1-4, on the other hand, the transformer required for this control is made in the form of a ring-core transformer 36, 43 instead and is mounted on the assembly composed of motor 1 and clutch and brake element 2.

In the embodiment according to FIG. 1, the housing 14 of fan 13 has been extended cylindrically outward to accommodate a ring-core transformer 36 in this annular space. The ring-core transformer 36 is fastened in housing 14 by means of casing resin 39. The path of the cooling air is represented in all of the drawings by directional arrows 38. The cooling air first passes over ring-core transformer 36 before it is guided through axial cooling channels 42 in motor 1 to the stator lamination bundle 12 and the stator winding 11, then through axial cooling channels in the clutch and brake element 2 and openings 20' provided in bearing plate 20 to leave elements 1 and 2.

Figure 2:
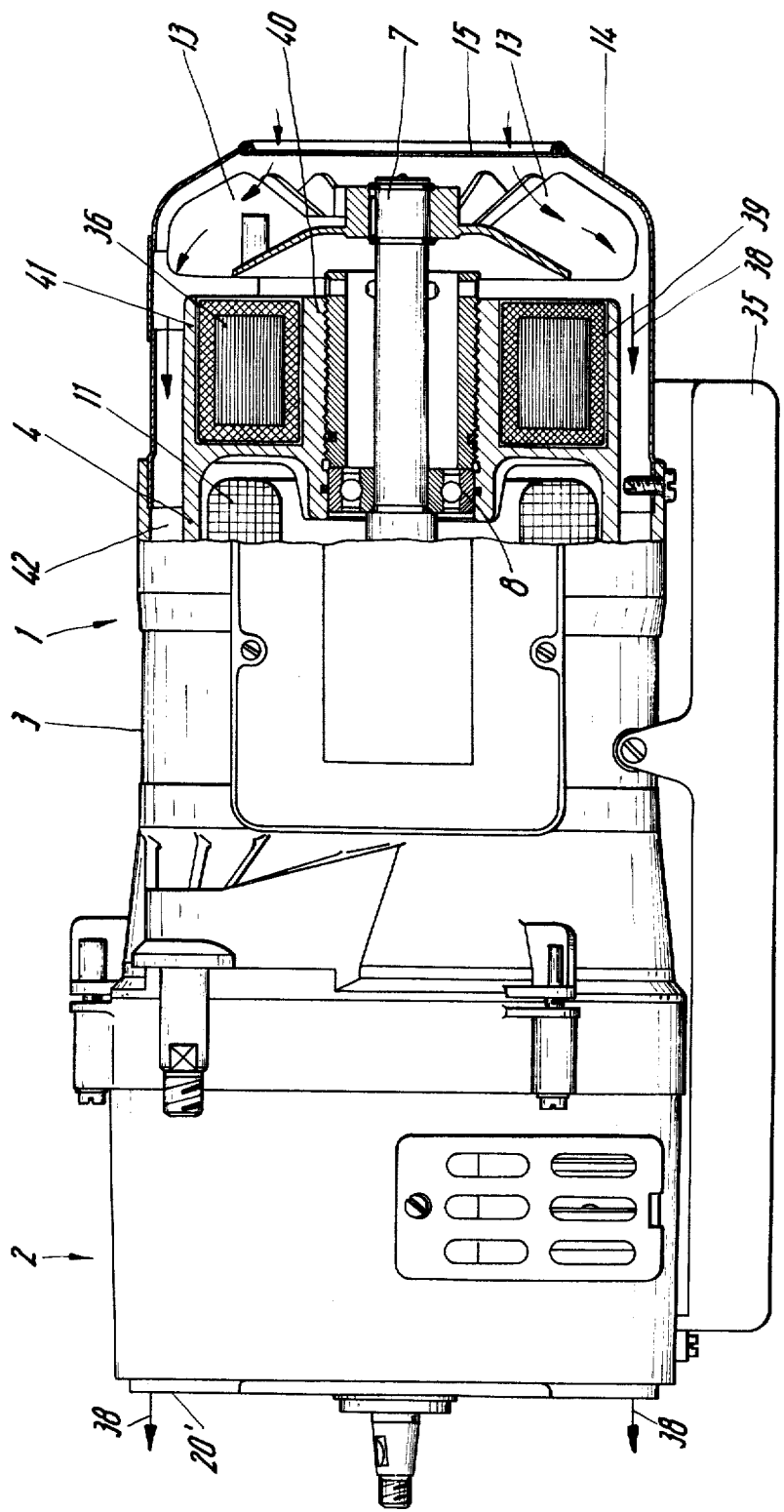
FIG. 2 is a motor according to FIG. 1 in a schematically represented lateral lengthwise view, with a ring-core transformer represented in cross-section as mounted on one bearing plate.

In the embodiment according to FIG. 2, the ring-core transformer 36 is mounted between correspondingly elongated cylindrical parts 40, 41 of bearing plate 4 facing fan 13, and fastened by means of casting resin 39 in this annular recess formed by the two cylindrical parts 40, 41. If the outer cylindrical part 41 is eliminated, the ventilation of ring-core transformer 36 by the cooling air provided by fan 13 is better than when cylindrical part 41 is present.

Figure 3:
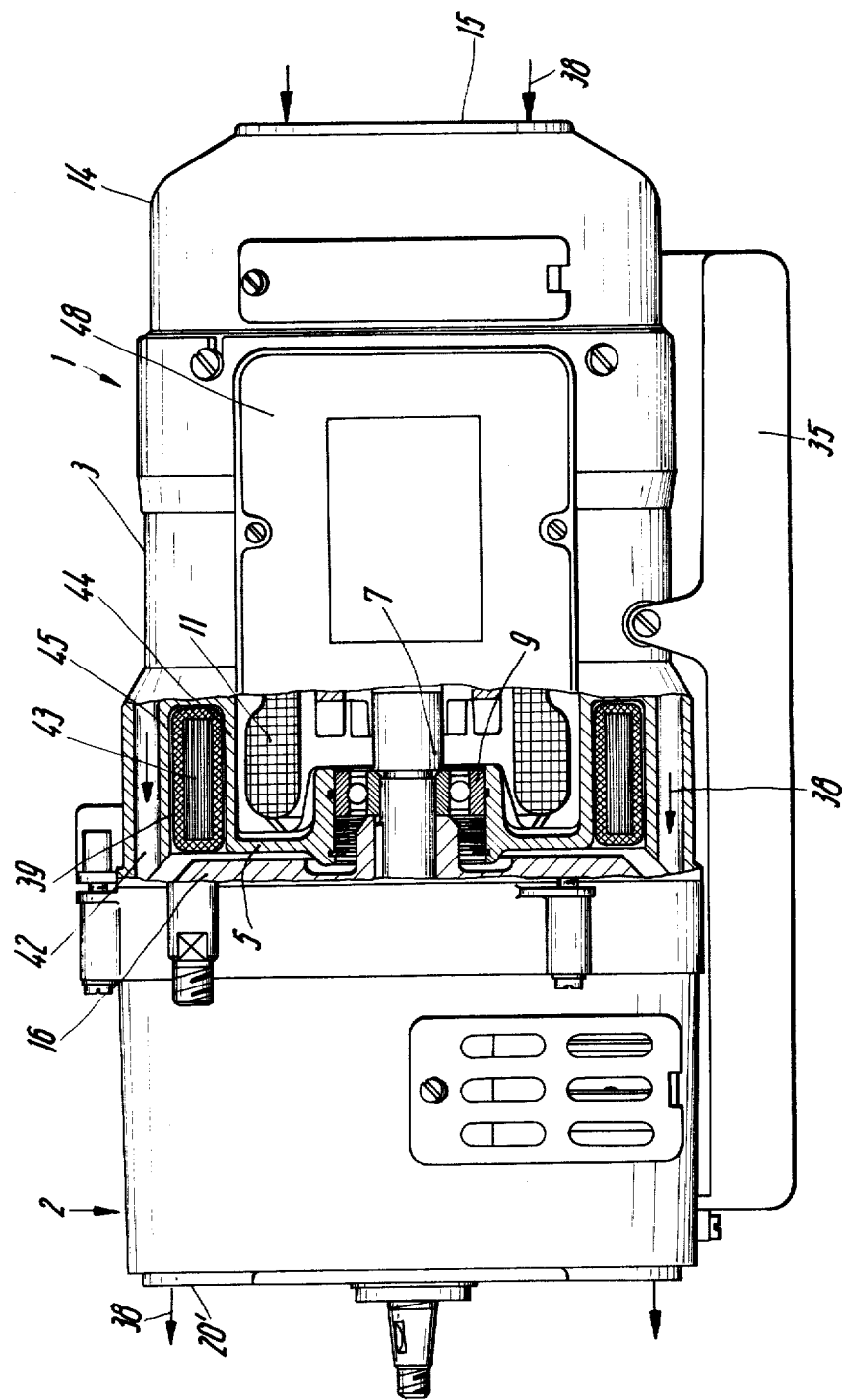
FIG. 3 is a motor according to FIG. 2, having a ring-core transformer shown in cross-section as mounted on the other bearing plate.

In the embodiment according to FIG. 3, a ring-core transformer designed in the same way as in the previous sample embodiments is mounted around the cylindrical part 44 of of bearing plate 5 which faces driven plate 16. Here a cylindrical part 45 is also mounted on the bearing plate and surrounding ring-core transformer 43 on the outside, said part 45 also being capable of being omitted to improve ventilation. Here again the ring-core transformer is fastened in the bearing plate by means of casting resin 39.

Figure 4:
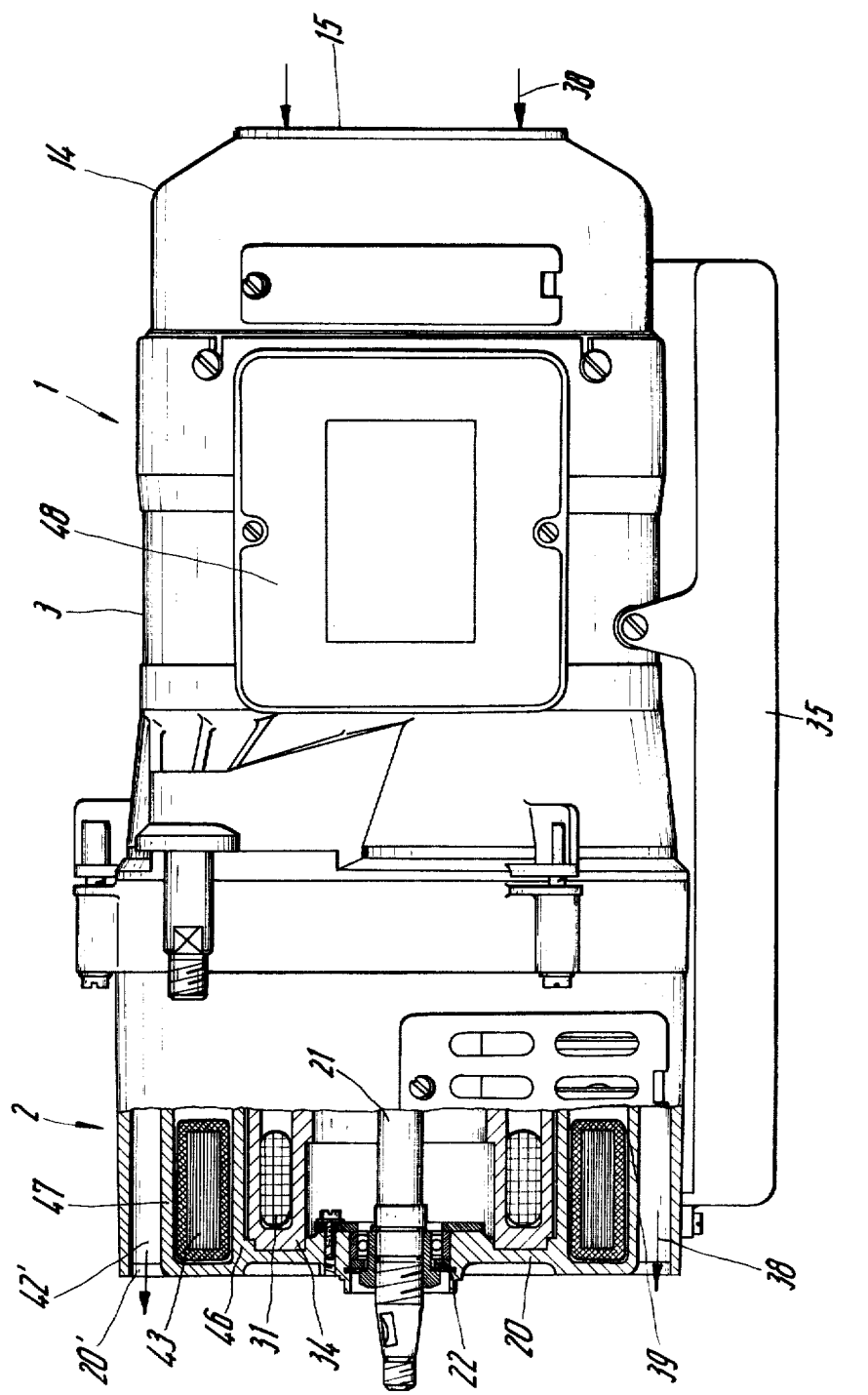
FIG. 4 is a motor according to FIG. 2, where a ring-core transformer is represented in cross-section as mounted on the bearing plate of the clutch and brake element.

In the embodiment according to FIG. 4, a recess is provided in clutch and brake element 2, specifically on bearing plate 20 of this clutch and brake element, said recess being formed by two inwardly projecting cylindrical annular passageways, with a ring-core transformer 43 mounted in said recess, likewise fastened in place by means of casting resin 39. In addition, the outer annular passageway 47 can be omitted to improve cooling, for which the axial cooling channels 42' are provided concentrically around the ring-core transformer 43.

All ring-core transformers 36 to 43 are mounted coaxially with respect to motor 1 and clutch and brake element 2. All ring-core transformers can also be fastened in place in another suitable fashion than with casting resin 39.

In all sample embodiments, the ring-core transformers are practically mounted in spaces that are already provided by the design of the motor 1 or clutch and brake element 2, so that the space required in control panel 35 is freed, thus leading to a desirable reduction of the size of the control panel. In addition, all ring-core transformers can be cooled well, a thin which is possible in control panel 35 only by having correspondingly large surfaces and correspondingly extensive use of space.

The wires for the ring-core transformers can be installed (in a fashion not shown) inside the motor housing, connecting with terminal box 48 or through an external wire to terminal 48 and control 35.

It will be obvious to those skilled in the art that various changes may be made without departing from the scope of the invention and the invention is not to be considered limited to what is shown in the drawings and described in the specification.

I claim:

1. In an electric motor variable speed and control drive comprising a housing, a motor within said housing and including a drive shaft disposed within said housing and extending therefrom, a clutch and brake unit means within said housing for connecting said drive shaft to said motor and for braking said drive shaft, and a control unit means connected to said housing for operating said clutch and brake unit means in a predetermined sequence, wherein said control unit means includes a transformer, the improvement wherein said transformer is made in the form of a ring-core transformer and is mounted within said housing coaxially with respect to the axis of said motor and said clutch and brake unit means.

2. A drive in accordance with claim 1, wherein said motor includes a fan to draw cooling air into said housing and around said motor and said clutch and brake unit means and wherein said ring-core transformer is mounted in the path of said cooling air.

3. A drive in accordance with claim 1, further including bearing plates within said housing supporting said motor and said clutch and brake unit means and wherein said ring-core transformer is fastened to one of said bearing plates.

4. A drive in accordance with claim 2, wherein an extension of said housing covers and fan and said ring-core transformer is mounted in said extension.

5. A drive in accordance with claim 1, further including support surface means connected to said housing for supporting at least one radial surface and one cylindrical surface of said ring-core transformer and wherein said transformer is mounted on said support surface means.

6. A drive in accordance with claim 5, wherein said ring-core transformer is fastened by means of casting resin to said support surface means.

* * * * *